United States Patent Office 3,533,931
Patented Oct. 13, 1970

3,533,931
PHOTOCHEMICAL PRODUCTION OF 2,3-BUTANE-DIOLS AND 1,2-DIBENZOYLETHANES
Hans-Dieter Becker, Schenectady, N.Y., assignor to General Electric Company, a corporation of New York
No Drawing. Filed Sept. 13, 1966, Ser. No. 578,986
Int. Cl. B01j 1/10
U.S. Cl. 204—158                                     7 Claims

ABSTRACT OF THE DISCLOSURE

Acetophenones which may be substituted in the 3- and 4-positions with methyl groups are irradiated with light having a wavelength in the range of 300–500 m$\mu$, but not substantially below 300 m$\mu$, in the presence of a phenol, but in the substantial absence of oxygen and applied heat to produce a mixture of the corresponding 2,3-butanediol and 1,2-dibenzoylethane. The dibenzoylethanes are useful, per se, as ketonic solvents or they may be reduced to the corresponding butanediol. The butanediols may be dehydrated to the corresponding butadienes which are useful polymerizable monomers.

---

This invention relates to a photochemical method for simultaneously producing 2,3-butanediols and 1,2-dibenzoylethanes and the novel 2,3-butanediols produced by this process.

The 2,3-butanediols of this invention may be looked upon as substituted ethylene glycols or pinacols. Pinacols are interesting dihydric alcohols which have received considerable study. They are usually made by reduction of ketones with active metals such as sodium, magnesium and aluminum, however, the yields are only fair.

Liquid acetophenone is stable when irradiated with ultraviolet light. In the presence of secondary alcohols, for example, secondary butanol, acetophenone and the alcohol undergo an oxidation-reduction reaction when irradiated with ultraviolet light whereby the acetophenone is reduced to 2,3-diphenyl-2,3-butanediol and the alcohol is oxidized to the ketone, i.e., secondary butanol to methyl ethyl ketone. Although benzophenone will likewise undergo this reaction in the presence of primary and secondary alcohols, especially isopropanol, substituents on the aryl nucleus of these phenones are known to seriously impair their photochemical activity. I have irradiated a solution of 25 g. of 4-methyl-acetophenone in 50 ml. of isopropanol for 40 hours. Vacuum distillation of the irradiated solution yielded 23 g. of unchanged 4-methylacetophenone and only 2 g. of 2,3-bis(4-methylphenyl)-2,3-butanediol, showing that the methyl substituent greatly hindered the photochemical reaction.

Unexpectedly, I have found that acetophenone, 4-methylacetophenone and 3,4-dimethylacetophenone, but not 2-methylacetophenone when irradiated in the substantial absence of oxygen and without the application of heat, in the presence of a small amount of phenol, produces equimolar amounts of the corresponding 2,3-butanediol and the 1,2-dibenzoylethane. For example, acetophenone produces equimolar amounts of 2,3-diphenyl-2,3-butanediol and 1,2-dibenzoylethane, 4-methylacetophenone produces equimolar amounts of 2,3-bis(4-methylphenyl)-2,3-butanediol and 1,2-bis(4-methylbenzoyl)ethane and 3,4-dimethylacetophenone produces equimolar amounts of 2,3-(3,4-dimethylphenyl)-2,3-butanediol and 1,2-bis-(3,4-dimethylbenzoyl)ethane. The various methylphenyl-2,3-butanediols are new chemical compounds.

It will be noted that the second and third carbon atoms in the 2,3-butanediols are asymmetric carbon atoms, each having the same substituent groups; i.e., they are equal asymmetric carbon atoms. Therefore, each of the 2,3-butanediol products can be expected to exist in three different isomeric forms, the two optically active forms and an optically inactive meso form. The two optically active forms would be expected to be produced as an optically inactive racemate along with the meso form so that the 2,3-butanediols products of this invention should be produced as a mixture of the racemate and meso form.

By way of illustration, 2,3-diphenyl-2,3-butanediol can have the following three different structural formulae:

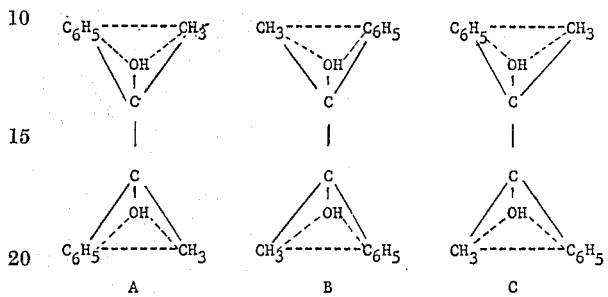

Because Formula C has a plane of symmetry, it would be expected to represent the meso or optically inactive form, while Formulae A and B would represent the two optically active forms which would be present in equimolar amounts in the racemate.

I have been able to separate one 2,3-butanediol produced in its pure form, because it is much less soluble in petroleum ether. This material is believed to be the optically inactive meso form. Evaporation of the petroleum ether leaves a residue which has been found by NMR spectroscopy to be a mixture of two forms, one of which is identical with the isolated form and the other is believed to be the racemate. The 2,3-butanediol products have thus been shown to be a mixture of the various isomers.

Since the above named acetophenones are all liquids at room temperature, no solvent is necessary for the reaction although an inert liquid solvent could be used if desired. However, no advantage is to be gained by the use of such a solvent.

In order to suppress side reactions, the wavelengths of the irradiation should be such that light is absorbed by the acetophenone, but not by either the product or the solvent if a solvent is used. To meet these criteria, the wavelengths of the light should include the range of 300–500 m$\mu$, but not essentially below 300 m$\mu$. The dibenzoylethane products are ketones as well as many solvents which can be used, for example, acetone, which all absorb in the region of 280 m$\mu$ and below. The wavelengths of the light may include those greater than 500 m$\mu$, but preferably the greatest proportion of the wavelength is in this cited range. Contact with oxygen and the heating of the solution during irradiation also promotes side reactions.

A convenient source of light to be used for irradiating the solution is obtained by using an ultraviolet light and passing it through a filter, for example, Pyrex glass, which will filter out all wavelengths of light below 300 m$\mu$. Alternatively, irradiation from any appropriate source may be used, keeping in mind that the actual range of wavelengths used should include the wavelengths which are absorbed by the particular acetophenone. The radiation source is preferably chosen to contain the greatest amount possible of the wavelengths which are absorbed by the acetophenone, but not by the other components of the reaction mixture. This is because only the light absorbed by the acetophenone is utilized in promoting the reaction. When using any of the above acetophenones, ultraviolet light from a mercury vapor quartz lamp filtered through Pyrex glass is very satisfactory for my process.

One of the advantages to be gained by not using a solvent is that the dibenzoylethanes produced are not very soluble in the acetophenones, and therefore, precipitate early in the reaction permitting the progress of the reaction to be monitored by continuous filtration of the reaction mixture during irradiation. It is possible to easily determine when the reaction is no longer proceeding by noting when no more precipitate forms. Alternatively, the reaction mixture may be continuously filtered and the filtrate flash evaporated to remove the unreacted acetophenone and the phenol promoter which are returned to the reaction mixture for additional irradiation with the residue being worked up to recover the butanediol product. It is generally not desirable to permit the precipitate of the dibenzoylethane to build up to such large concentrations that the entire reaction mixture becomes filled with precipitate and becomes opaque since this tends to cut down on the amount of irradiation reaching the solution. However, I have run reactions whereby essentially the whole reaction mixture has become a solid with the precipitate of the dibenzoylethane product with high quantum efficiency.

As mentioned before, the photochemical reaction of the acetophenones with themselves is promoted or catalyzed by the presence of a small amount of a phenol. This phenol may be any phenol, for example, phenol itself, cresols, xylenols, naphthals, dihydric phenols, trihydric phenols, etc. However, it should be kept in mind, that certain of the dihydric and trihydric phenols tend to produce byproducts which are colored products which interfere with the irradiation. I therefore prefer to use monohydric phenols and especially the monohydric phenols of the benzene series. Of all of the phenols, phenol itself is the most effective in producing highest yields.

Furthermore, I have found that when the phenol is adsorbed on an inert solid carrier, for example, silica gel, molecular sieves, alumina, etc., that the efficiency of the phenol is even further increased by a factor of about 4. It should be kept in mind that the particular inert carrier is preferably one which is transparent to the irradiation used since the carrier and its sorbed phenol preferably is kept dispersed throughout the reaction mixture, for example, by stirring or sparging with an inert gas during the irradiation. If the carrier is opaque, it will tend to cut down on the amount of light transmitted by the solution. Of all of the inert carriers, silica gel appears to be the most ideal inert carrier for the phenol.

When a carrier is used for the phenol, it is to be recognized that it will be removed by filtration of the precipitate of the dibenzoylethane product and an additional amount will have to be added to the recovered acetophenone before returning to the reaction vessel for further irradiation. The dibenzoylethane product is easily dissolved permitting removal of the inert carrier and recovery of the dibenzoylethane product by evaporation of the solvent.

Only very small amounts of the phenol need to be used, e.g., on the order of 0.1% to 10% by weight of the acetophenone used. Larger amounts can be used but are not necessary. Amounts smaller than 0.1% may be used, e.g., as low as 0.01% or less when a decrease in efficiency can be tolerated.

In order that those skilled in the art may better understand my invention, the following examples are given by way of illustration, but not by way of limitation. In all of the examples, all parts and percentages are by weight unless stated otherwise. In the elemental analyses of the products, the values given are in percent. The theoretical values for the analyses and molecular weights are given in parentheses following the determined values.

GENERAL PROCEDURE

The light source used was a 100 watt mercury vapor lamp, General Electric type H-100 A 4/T, from which the glass jacket had been removed, leaving only the quartz envelope. This was surrounded by a Pyrex tube assembled to allow water cooling. The lamp and Pyrex jacket were surrounded by a vessel containing the reaction mixture. After introduction of the desired acetophenone and the phenol into the reaction chamber, the reaction mixture was purged with an inert gas, for example, nitrogen, and the solution cooled to 16° C. at which temperature it was irradiated. The precipitate of the dibenzoylethane was removed by filtration of the reaction mixture and this product separated from the inert carrier and its sorbed phenol by dissolving the precipitate in chloroform which was then filtered to remove the inert carrier. The chloroform was evaporated to recover the dibenzoylethane product.

Vacuum distillation of the original filtrate recovered the unreacted acetophenone as the distillate leaving a viscous residue of an additional amount of the dibenzoylethane and the 2,3-butanediol. Treatment of viscous residue with methanol dissolved the butanediol product, but not the balance of the dibenzoylethane product which could then be removed by filtration. Vacuum distillation of the filtrate permitted isolation of the isomers of the butanediols. Partial separation of one of the isomers, probably the meso isomer, is accomplished by treatment of the mixture with boiling petroleum ether (B.P. 30–60° C.) which dissolves the racemate, but only a small amount of the meso form. The phenol was adsorbed on the silica gel by heating the phenol and silica together with stirring above the melting point of the phenol.

This above general procedure was used in the following examples.

EXAMPLE 1

A suspension of 1 g. of phenol adsorbed on 5 g. of silica gel in 75 g. of acetophenone was irradiated for 24 hours. The colorless crystalline precipitate was removed by filtration. Separation of the silica gel from the precipitated product was effected by treatment with chloroform and filtration. After evaporation of the chloroform there was obtained 9.15 g. of 1,2-dibenzoylethane having a melting point of 144–145° C. which is that reported in the literature for this compound.

Vacuum distillation of the original filtrate at 1 mm. pressure gave 50 g. of recovered acetophenone. Treatment of the viscous residue with 30 ml. of methanol caused precipitation of an additional 1.5 g. of 1,2-dibenzoylethane for a total yield of 10.65 g. After filtration, the filtrate was subjected to vacuum distillation at 1 mm. pressure yielding a mixture of the stereoisomeric 2,3-butanediols as a colorless distillate (B.P. 160–165° C.) which crystallized on cooling to room temperature. There was obtained 11.1 g. of the mixture of stereoisomers of 2,3-diphenyl-2,3-butanediol, melting between 85–95° C. Partial separation of one isomer, believed to be the meso isomer, was accomplished by treatment of the mixture with petroleum ether (B.P. 30–60° C.) in which this isomer was not very soluble and was removed by filtration and recrystallized from petroleum ether (B.P. 65–110° C.) There was obtained 3 g. of this isomer having a melting point of 123–125° C. which compares with the melting point in the literature of 123° C.

The part of the crystalline distillate which was dissolved in petroleum ether was analyzed by NMR spectroscopy and found to consist of a mixture of two 2,3-diphenyl-2,3-butanediols, one of which was identical with the pure isomer described above. This is what would be expected if the mixture contained the meso and racemic forms.

EXAMPLE 2

Using the general procedures and the details of Example 1, a suspension of 3 g. of phenol adsorbed on 15 g. of silica gel in 73 g. of 4-methylacetophenone was irradiated for 15 hours and then worked up in the same manner as described in Example 1. The amount of precipitated 1,2-bis(4-methylbenzoyl)ethane isolated from the reaction mixture was 4.8 g., that from the filtrate was 1.4 g., giving a total yield of 6.2 g., having a melting point of 159–160° C. (literature 159° C.). The amount of recovered 4-methylacetophenone was 59 g. and the yield of distilled liquid mixture of isomeric 2,3-bis(4-methylphenyl)-2,3-butanediols having a boiling point of 165° C. at 1 mm. was 7 g. Treatment of the oily distillate with petroleum ether caused one of the isomers to crystallize (yield 1.8 g.), having a melting point of 135–136° C. The non-crystallizable fraction of the distillate was analyzed by NMR spectroscopic means and was found to consist of two 2,3-bis(methylphenyl)-2,3-butanediols, one of which was identical with the crystalline isomer.

EXAMPLE 3

Using the general procedure and the details of Example 1, a suspension of 1 g. of phenol adsorbed on 5 g. of silica gel in 80 g. of 3,4-dimethylacetophenone was irradiated for 22 hours. This reaction mixture was then treated in the same manner as described in Example 1. Filtration of the reaction mixture yielded 2.1 g. of 1,2-bis(3,4-dimethylbenzoyl)ethane with an additional 0.75 g. being isolated after evaporation of the acetophenone giving a total yield of 2.85 g., having a melting point of 157° C. There was recovered 74 g. of unreacted 3,4-dimethylacetophenone. Vacuum distillation yielded 3 g. of a colorless liquid distillate, boiling between 200–240° C. at 1 mm. pressure, consisting of the mixture of isomeric 2,3-bis(3,4-dimethylphenyl)-2,3-butanediols. Treatment of this liquid distillate with petroleum ether yielded 0.35 g. of one of the isomers as an undissolved, crystalline precipitate having a melting point of 129–131° C., after recrystallization from petroleum ether (B.P. 65–110° C.). Additional crystalline material which separated from the original petroleum ether filtrate consisted of a mixture of the stereoisomeric 2,3-bis(3,4-dimethylphenyl)-2,3-butanediols. Yield 0.75 g., having a melting point of 100–120° C.

The oily residue obtained from the final petroleum ether filtrate, after evaporation of the solvent, yielded, upon treatment with methanol, 0.25 g. of 2,3-bis(3,4-dimethylphenyl)-1,4-butadiene as colorless crystals having a melting point of 73° C. This material was obtained by dehydration of the 2,3-butanediol during the isolation steps.

Elemental analyses and molecular weights of the 1,2-dibenzoylethanes and the 2,3-butanediols prepared above are shown in Table I and Table II respectively. In Table II, the first value for each example is that of the isolated isomer, while the second value is that of the mixture of isomers remaining after removal of the isolated isomer. The values in parentheses are the theoretical values.

TABLE I

| Example: | C | H | M.W. |
|---|---|---|---|
| 1 | 80.64 (80.65) | 6.09 (5.92) | 239 (238.29) |
| 2 | 81.21 (81.17) | 6.99 (6.81) | 266 (266.34) |
| 3 | 81.44 (81.60) | 7.64 (7.53) | 289 (294.40) |

TABLE II

| Example: | C | H | M.W. |
|---|---|---|---|
| 1 | 79.46 (79.31) 79.51 | 7.64 (7.49) 7.68 | 244 (242.32) 241 |
| 2 | 79.76 (79.96) 80.03 | 8.26 (8.20) 8.22 | 268 (270.38) 266 |
| 3 | 80.32 (80.50) 80.20 | 8.82 (8.78) 8.96 | 292 (298.43) 292 |

The corresponding values for the 2,3-bis(3,4-dimethylphenyl)-1,4-butadiene are C, 91.52 (91.55); H, 8.71 (8.45); M.W., 263 (262.40).

The 2,3-butanediols of this invention have wide variety of uses. For example, they may be dehydrated to the corresponding butadienes which are useful as polymerizable monomers in the making of polymers and copolymers or the butanediols themselves may be esterified with polybasic acids to produce polyester, per se, or in conjunction with other dihydric alcohols to produce copolymeric polyesters. They are also useful in the making of polyurethanes either alone or as modifiers with other dihydric alcohols. The dibenzoylethanes may be used per se, as ketonic solvents or as ketones in chemical reactions, for example, they may be converted in the corresponding furanes, or they may be reduced with a reducing agent, for example, hydrogen, to the correspond dihydric alcohol having the same utility as disclosed above for the butanediols. Other uses for the butanediols and dibenzoylethanes of this invention will be readily recognized by those skilled in the art.

Obviously, other modifications and variations of the present invention are possible in light of the above teachings. Therefore, it is to be understood that changes may be made in the particular embodiments of the invention described which are within the full intended scope of the invention as defined by the appended claims.

What I claim as new and desire to secure by Letters Patent of the United States is:

1. The method of simultaneously making a diphenyl 2,3-butanediol and a 1,2-dibenzoylethane which comprises irradiating in the substantial absence of oxygen and applied heat, an acetophenone selected from the group consisting of acetophenone, 4-methylacetophenone and 3,4-dimethylacetophenone in the presence of a phenol selected from the group consisting of phenol, cresols and xylenols, using light having a wavelength in the range of 300–500 m$\mu$, but not substantially below 300 m$\mu$.

2. The process of claim 1, wherein the phenol is absorbed on an inert solid carrier.

3. The process of claim 1, wherein the phenol is phenol itself which has been absorbed on an inert solid carrier.

4. The process of claim 1 wherein the phenol is phenol itself.

5. The process of claim 1 wherein the acetophenone is acetophenone itself and the phenol is phenol itself.

6. The process of claim 1 wherein the acetophenone is 4-methylacetophenone and the phenol is phenol itself.

7. The process of claim 1 wherein the acetophonone is 3,4-dimethylacetophonone and the phenol is phenol itself.

References Cited

Stather et al.: Chemical Abstracts, vol. 46, columns 5875–5876 (1952).

Huyser et al.: J. Am. Chem. Soc., vol 85, pp. 3641–44 (1963).

LEON ZITVER, Primary Examiner

M. W. GLYNN, Assistant Examiner

U.S. Cl. X.R.

260—618